(12) United States Patent
Robota (10) Patent No.: US 10,215,349 B1
(45) Date of Patent: Feb. 26, 2019

(54) MAGNETIC ROW MOUNTING SYSTEM FOR LUMINAIRES

(71) Applicant: Eaton Intelligent Power Limited, Dublin (IE)

(72) Inventor: Andrew L. Robota, Senoia, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/024,271

(22) Filed: Jun. 29, 2018

(51) Int. Cl.
| | |
|---|---|
| *F21S 8/04* | (2006.01) |
| *F21V 23/06* | (2006.01) |
| *F21V 33/00* | (2006.01) |
| *F21V 17/10* | (2006.01) |
| *F21V 21/02* | (2006.01) |
| *F21S 2/00* | (2016.01) |
| *F16B 1/00* | (2006.01) |

(52) U.S. Cl.
CPC ............. *F21S 8/043* (2013.01); *F21S 2/005* (2013.01); *F21V 17/105* (2013.01); *F21V 21/02* (2013.01); *F21V 23/06* (2013.01); *F21V 33/00* (2013.01); *F16B 2001/0035* (2013.01)

(58) Field of Classification Search
CPC .............. F21S 2/00–2/005; F21S 8/00; F21S 8/04–8/046; F21V 21/08; F21V 21/096; F21V 17/105
See application file for complete search history.

(56) References Cited

U.S. PATENT DOCUMENTS

| | | | |
|---|---|---|---|
| 2010/0197148 A1* | 8/2010 | Rudisill ................. | H01R 11/30 439/40 |
| 2013/0122724 A1* | 5/2013 | Velazquez ................ | F21S 2/00 439/39 |
| 2016/0290571 A1* | 10/2016 | Chamberlain ........ | F21V 19/004 |
| 2017/0051894 A1* | 2/2017 | Farrell .................. | F21V 15/015 |

* cited by examiner

*Primary Examiner* — Mariceli Santiago
(74) *Attorney, Agent, or Firm* — King & Spalding LLP (57) ABSTRACT

A magnetic row mounting system includes a magnet holding bracket that is configured to be removably coupled to an end plate of a luminaire. The magnet holding bracket includes a body that has a first surface and an opposite second surface. Further the body includes a plurality of magnet housing cavities that are configured to house magnets therein. Furthermore, the body of the magnet holding bracket includes an alignment cavity that is configured to receive an orientation tab of the end plate therein to removably couple the magnet holding bracket to the end plate in only one direction. Alternatively, the magnetic row mounting system includes both the end plate of the luminaire and the magnet holding bracket that is configured to be removably coupled to the end plate.

20 Claims, 12 Drawing Sheets

MAGNETIC ROW MOUNTING SYSTEM FOR LUMINAIRES

TECHNICAL FIELD

The present disclosure relates generally to lighting solutions, and more particularly to a magnetic row mounting system for luminaires.

BACKGROUND

Luminaires that are mounted in a linear row can be joined by mechanically connecting two or more luminaires at their ends to create a continuous row of modular luminaires. Said mechanical connections between the luminaires may be rigid, thereby making the row mounted luminaires susceptible to fracture when at least one luminaire of the row mounted luminaires is hit by an object. For example, when the row mounted luminaires are mechanically connected to each other, an impact on one luminaire in a series a row mounted luminaires may be carried over to a remainder of the luminaires and may damage one or more of the remainder of the luminaires, especially when the row mounted luminaires are also suspension mounted.

This background information is provided to reveal information believed to be of possible relevance to the present disclosure. No admission is necessarily intended, nor should be construed, that any of the preceding information constitutes prior art against the present disclosure.

SUMMARY

In one aspect, a magnetic row mounting system includes a magnet holding bracket that is configured to be removably coupled to an end plate of a luminaire. The magnet holding bracket includes a body that has a first surface and a second surface. The first surface is opposite to the second surface. Further, the magnet holding bracket includes a magnet housing cavity that is formed in the body and configured to house a magnet therein.

In another aspect, a magnetic row mounting system includes an end plate of a luminaire that is configured to be coupled to and cover an end of a luminaire. Further, the magnetic row mounting system includes a magnet holding bracket that is configured to be removably coupled to the end plate of the luminaire. The magnet holding bracket includes a body that has a first surface and a second surface. The first surface is opposite to the second surface. Further, the magnet holding bracket includes a magnet housing cavity that is formed in the body and configured to house a magnet therein.

In yet another aspect, a luminaire system includes a first luminaire that has a first end, a first end plate that is coupled to the first end to cover the first end of the first luminaire, and a first magnet holding bracket that is removably coupled to the first end plate. The first magnet and housing a first set of magnets such that a first pole of the first set of magnets faces an inner surface of the first end plate. Further, the luminaire system includes a second luminaire that has a second end, a second end plate that is coupled t the second end to cover the second end of the second luminaire, and a second magnet holding bracket that is removably coupled to the second end plate. The second magent holding bracket houses a second set of magnets such that a second pole of the second set of magnets faces an inner surface of the second end plate. The first pole of the first set of magnets is opposite to the second pole of the second set of magnets such that the first set of magnets housed in the first magnet holding bracket at the first end plate attract the second set of magnets housed in the second magnet holding bracket at the second end plate to magnetically couple the first luminaire and the second luminaire at the first end and the second end in a row mounted configuration.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a magnetic row mounting system that provides a non-mechanical solution for row mounting two or more luminaires. That is, the magnetic row mounting system of the present disclosure allows luminaires to be row mounted without any mechanical connection. The term 'mechanical connection' as used herein may generally refer to joining of two or more elements by rigid connection mechanisms such as, but not limited to, adhesives, mechanical fasteners like bolts, rivets, screws, hook and eye features, straps, double sided end brackets, etc. The magnetic row mounting system reduces the likelihood of fracture in the luminaires that are row mounted from an impact on any one of the luminaires because the connections between the row mounted luminaires are not rigid. For example, if one luminaire of a plurality of luminaires that are row mounted using the magnetic row mounting system is hit by an object, the row mounted luminaires will give way or separate from each other at their magnetically coupled ends because there are no mechanical connections to break. Further, the luminaires may re-align back into the row mounted position on their own because of the magnetic attraction between the luminaires through the magnetic row mounting system disposed therein.

In one example, the magnetic row mounting system may include a magnet holding bracket that is configured to house one or more magnets therein. In another example, the magnetic row mounting system may include both the magnet holding bracket and an end plate of a luminaire to which the magnet holding bracket is coupled. The magnet holding bracket may be removably coupled to the end plate of a luminaire. The end plate comprising the magnet holding bracket and the magnets disposed therein may be coupled to one or both the ends of each luminaire that is to be row mounted. Unless expressly stated otherwise, the term 'end(s) of a luminaire' as used herein may refer to the shorter (narrower) ends of a linear luminaire.

Ends of luminaires that have opposite magnetic polarity via the magnetic row mounting system may attract each other such that the luminaires are magnetically coupled to create a seamless row of luminaires. For example, a first luminaire may include a first end plate disposed at a first end of the first luminaire. The first end plate may include a first magnet holding bracket that houses a first set of magnets therein. Further, in said example, a second luminaire may include a second end plate that is disposed at a first end of a second luminaire. The second end plate may include a second magnet holding bracket that houses a second set of magnets therein. The first set of magnets may be oriented such that a north pole of the first set of magnets faces the first end plate disposed at the first end of the first luminaire while the south pole of the first set of magnets faces away from the first end plate, or vice-versa. Similarly, in said example, the second set of magnets may be oriented such that a south pole of the second set of magnets faces the second end plate disposed at the first end of the second luminaire while the north pole of the second set of magnets faces away from the second end plate, or vice-versa. In said example, the first ends of the first luminaire and the second luminaire may have opposite magnetic polarity and thereby attract each other to magnetically couple the first and second luminaires in a row mounted configuration.

In one example embodiment, the magnetic row mounting system may be factory installed within a luminaire. However, in another example embodiment, the magnetic row mounting system may be field installed within the luminaire by an end user. In yet another example embodiment, the magnetic row mounting system may be configured for retrofitting existing luminaires by field installing the magnetic row mounting system within the existing luminaires.

Example embodiments of the magnetic row mounting system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the magnetic row mounting system may be embodied in many different forms and should not be construed as being limited to the embodiments set forth herein; rather, these embodiments are provided so that this disclosure will be thorough and complete, and will fully convey the scope of the technology to those appropriately skilled in the art. Even though the present disclosure may describe the magnetic row mounting system as being used with suspension mounted luminaires that are to be arranged in a row mounted configuration, one of skill in the art can understand and appreciate that in other example embodiments, the magnetic row mounting system may be used with any appropriate type of luminaires. The magnetic row mounting system may be configured to replace any appropriate rigid connection mechanism that is used to connect two or more luminaires.

The magnetic row mounting system (or components thereof) described herein can be made of one or more of a number of suitable materials to allow the magnetic row mounting system and/or other associated components of the magnetic row mounting system to meet certain standards, cost requirements, and/or regulations while also maintaining durability in view of the one or more conditions under which the luminaire and/or other associated components of the luminaire can be exposed. Examples of such materials can include, but are not limited to, plastic, fiberglass, ceramic, etc.

Further, components of the magnetic row mounting system (or portions thereof) described herein can be made from a single piece. In addition, or in the alternative, components of the magnetic row mounting system (or portions thereof) can be made from multiple pieces that are coupled to each other. In such a case, the multiple pieces can be coupled to each other using one or more of a number of coupling methods, including but not limited to adhesives, compression fittings, mating threads, and slotted fittings, etc. One or more pieces that are coupled to each other can be coupled to each other in one or more of a number of ways, including but not limited to fixedly, hingedly, removeably, slidably, and threadably.

Terms such as "first", "second", "third", "top", "bottom", "side", "end", and "within" are used merely to distinguish one component (or part of a component or state of a component) from another. Such terms are not meant to denote a preference or a particular orientation, and are not meant to limit embodiments of the luminaire. In the following detailed description of the example embodiments, numerous specific details are set forth in order to provide a more thorough understanding of the present disclosure. However, it will be apparent to one of ordinary skill in the art that the magnetic row mounting system of the present disclosure may be practiced without these specific details. In other instances, well-known features have not been described in detail to avoid unnecessarily complicating the description.

Turning now to the figures, example embodiments of a magnetic row mounting system will be described in connection with FIGS. 1-12. Referring to FIGS. 1-12, an example magnetic row mounting system 100 may include an end plate 102 that is configured to be disposed at and to cover an end 802 of a luminaire 800 (shown in FIG. 8). Further, the example magnetic row mounting system 100 may include a magnet holding bracket 104 that may be removably coupled to the end plate 102. The magnet holding bracket 104 may be configured to house one or more magnets (not shown in the Figures) therein. In some example embodiments, the magnetic row mounting system 100 may not include the end plate 102. Instead, the magnetic row mounting system 100 may only include the magnet holding bracket 104 with or without the magnets housed therein.

Figure 2:
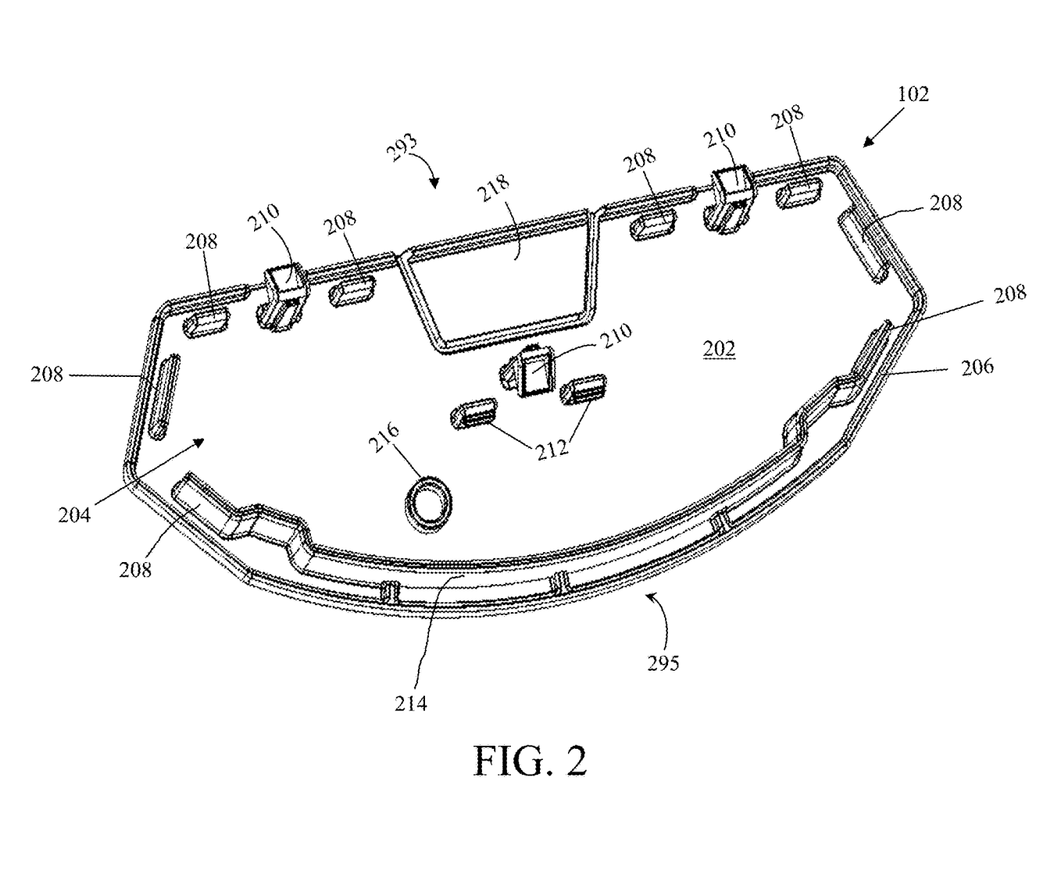
FIG. 2 illustrates a perspective view of an example end plate of the example magnetic row mounting system of FIG. 1, in accordance with example embodiments of the present disclosure.
Figure 3:
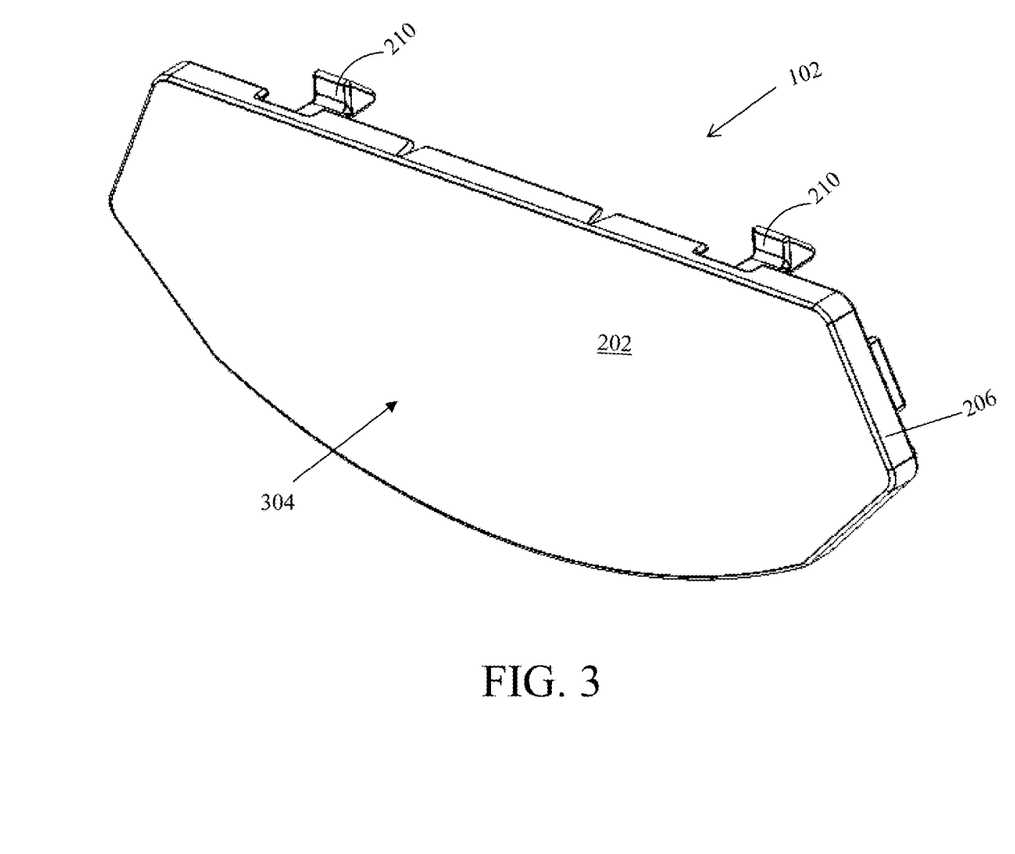
FIG. 3 illustrates another perspective view of the example end plate of the example magnetic row mounting system of FIG. 1, in accordance with example embodiments of the present disclosure.

As illustrated in FIGS. 2 and 3, the end plate 102 may include a base 202 that has an inner surface 204 and an outer surface 304 that is opposite to the inner surface 204. Further, the end plate 102 may include a sidewall 206 that extends from a perimeter of the base 202 and is substantially perpendicular to the base 202. Furthermore, the end plate 102 may include a plurality of coupling features that are formed on the inner surface 204 of the base 202. The plurality of coupling features may be configured to: (a) removably couple the end plate 102 to the ends 802 of the luminaire 800, (b) removably couple the magnet holding bracket 104 to the end plate 102.

The plurality of coupling features may include a set of guiding tabs 208 that are disposed on the base 202 and adjacent the sidewall 206 of the end plate 102. The guiding tabs 208 may be substantially perpendicular to the base 202. The guiding tabs 208 may be configured to assist in an alignment of the end plate 102 with an end 802 of a housing cover 804 (e.g., wrap around cover) (shown in FIG. 8) of the luminaire 800 to removably couple the end plate 102 to the luminaire 800. Further, the plurality of coupling features may include a first set of cantilever snap fit tabs 210 (herein 'first set of snap fit tabs 210') and a second set of cantilever snap fit tabs 212 (herein 'second set of snap fit tabs 212') that are disposed on and extend substantially perpendicular to the base 202. The first set of snap fit tabs 210 are configured to engage with corresponding slots in the housing cover 804 of the luminaire 800 to removably couple the end plate 102 to the luminaire 800 via a snap fit mechanism. Similarly, the second set of snap fit tabs 212 are configured to removably couple the magnet holding bracket 104 to the end plate 102.

Figure 1:
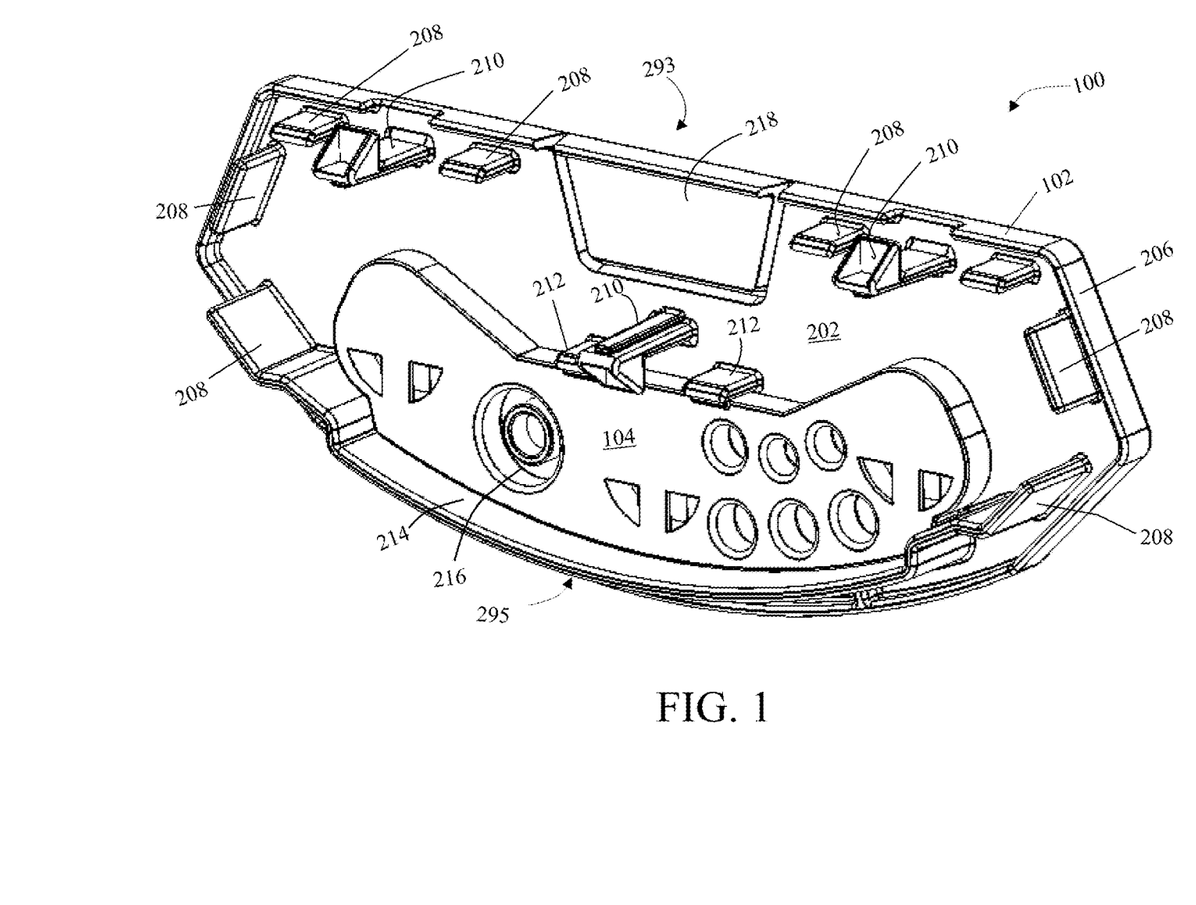
FIG. 1 illustrates a perspective view of an example magnetic row mounting system for luminaires, in accordance with example embodiments of the present disclosure.
Figure 11:
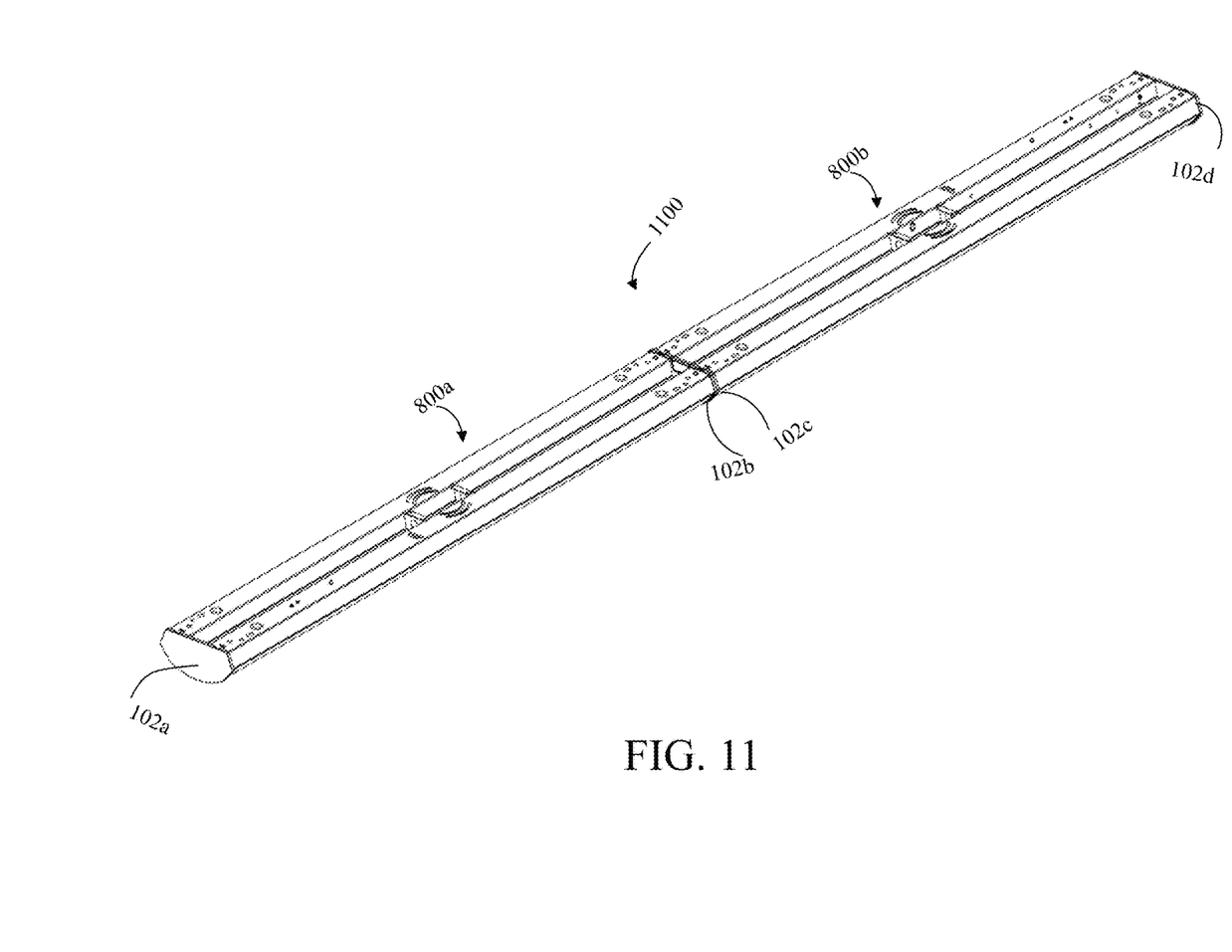
FIG. 11 illustrates a perspective view of an example row mounted luminaire assembly where two linear luminaires are row mounted using the magnetic row mounting system of FIG. 1, in accordance with example embodiments of the present disclosure.

The end plate 102 may further include a retaining wall 214 that is disposed on and extends substantially perpendicular to the base 202. The retaining wall 214 may be configured to support the magnet holding bracket 104 thereon. That is, the magnet holding bracket 104 may rest on the retaining wall 214. As illustrated in FIGS. 1 and 2, the retaining wall 214 may be disposed below and spaced apart from the second set of snap fit tabs 212 such that the magnet holding bracket 104 can be received in the space between the second set of snap fit tabs 212 and the retaining wall 214. Further, the end plate 102 may include an orientation tab 216 that is substantially cylindrical in shape. The orientation tab 216 may be disposed on and may extend substantially perpendicular to the base 202. The orientation tab 216 may be configured to operate as a poka yoke which ensures that the magnet holding bracket 104 is coupled to the end plate 102 only in one direction. In particular, the second set of snap fit tabs 212, the retaining wall 214, and the orientation tab 216 are configured to operate in concert to removably couple and securely retain the magnet holding bracket 104 to the end plate 102 as illustrated in FIG. 1. Furthermore, the base 202 of the end plate 102 may include a knockout tab 218 that extends from the side wall 206 at the top portion 293 of the end plate 102 towards the bottom portion 295 of the end plate 102. The knockout tab 218 is configured to be detached or cut out from the end plate 102 to define a wire routing channel for routing electrical wires between row mounted luminaires, e.g., luminaire 800a and luminaire 800b as illustrated in FIG. 11.

Figure 4:
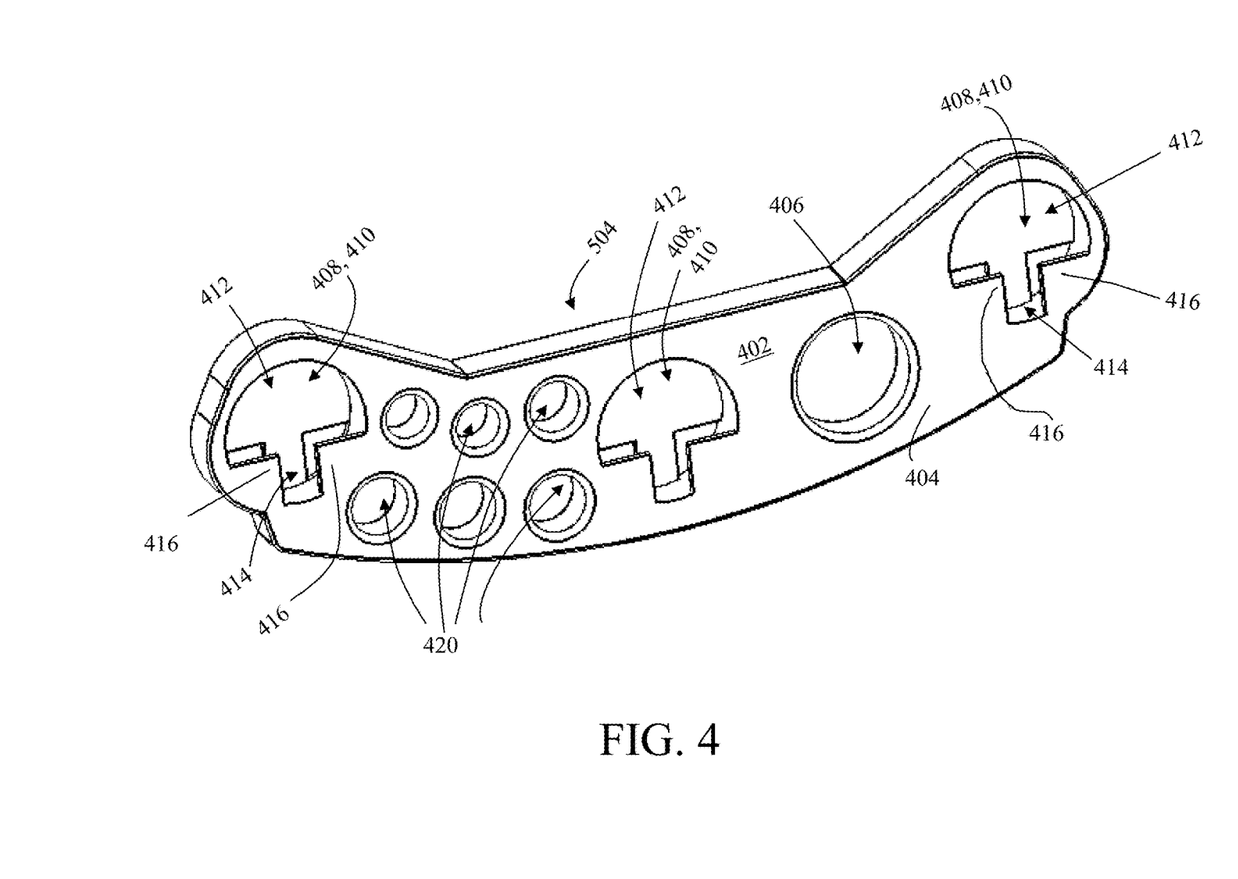
FIG. 4 illustrates a perspective view of a first example magnet holding bracket of the example magnetic row mounting system of FIG. 1, in accordance with example embodiments of the present disclosure.
Figure 5:
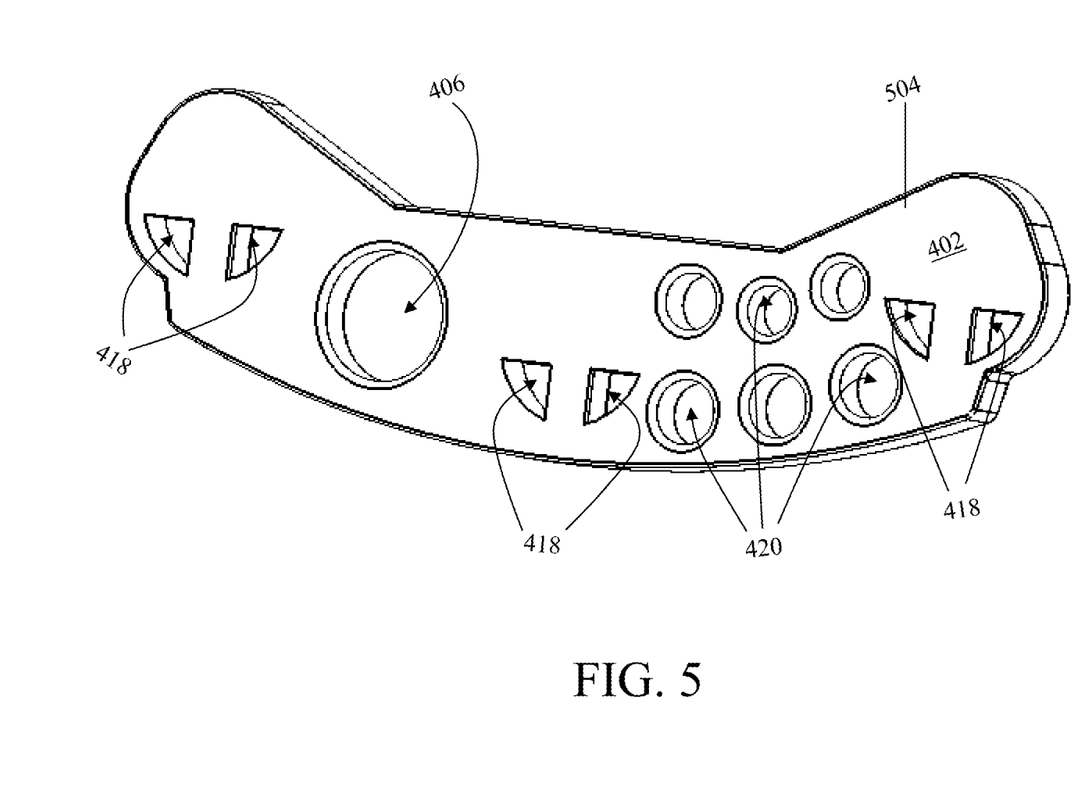
FIG. 5 illustrates another perspective view of the first example magnet holding bracket of the example magnetic row mounting system of FIG. 1, in accordance with example embodiments of the present disclosure.
Figure 7:
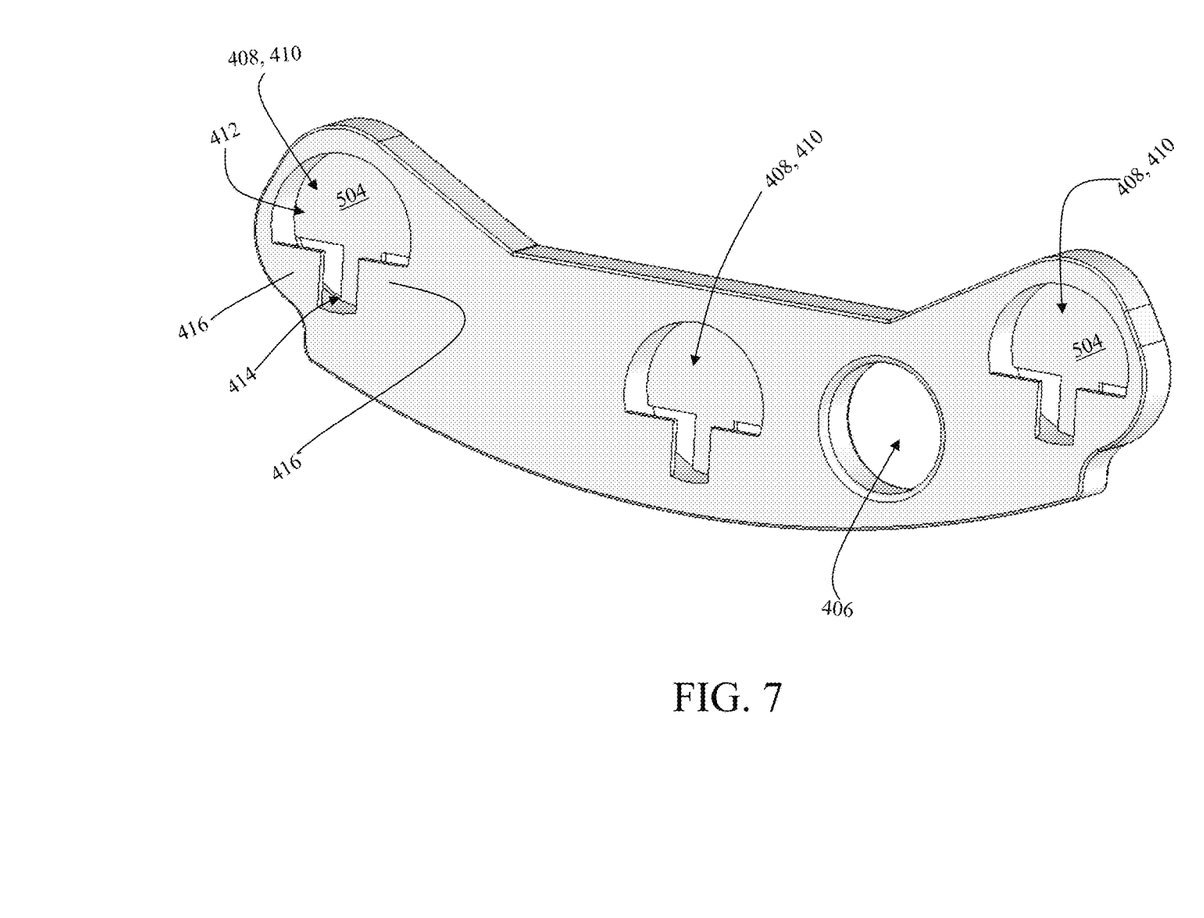
FIG. 7 illustrates another perspective view of the second example magnet holding bracket, in accordance with example embodiments of the present disclosure.

As illustrated in FIGS. 4 and 5, the magnet holding bracket 104 may include a body 402 that has a first surface 404 and a second surface 504 that is opposite to the first surface 404. The body 402 may include an alignment cavity 406 that is configured to receive the orientation tab 216 of the end plate 102 such that the magnet holding bracket 104 may be coupled to the end plate 102 only in one direction, i.e., with the first surface 404 facing the inner surface 204 of the end plate 102. Further, the body 402 may include one or more magnet housing cavities 408, each magnet housing cavity 408 being configured to house a magnet (not shown in the Figures) therein. Each magnet housing cavity 408 may be substantially cylindrical in shape and may extend from a magnet receiving opening 410 on the first surface 404 to the second surface 504. The magnet receiving opening 410 on the first surface 404 may include a substantially semicircular top opening portion 412 and a substantially rectangular bottom opening portion 414 that extends out from the middle of a flat edge of the semicircular top opening portion 412 as illustrated in FIGS. 4 and 7.

In particular, the substantially rectangular bottom opening portion 414 may be defined by two restraining tabs 416 that extend into the magnet receiving opening 410 such that when a magnet is disposed in the magnet housing cavity 408, the magnet does not fall out through the magnet receiving opening 410 on the first surface 404. The restraining tabs 416 are configured to securely retain a magnet in the magnet housing cavity 408 such that the magnet does not inadvertently fall out of the magnet housing cavity 408. In other words, the magnet receiving opening 410 on the first surface 404 of the magnet holding bracket 104 may be configured such that once a magnet is disposed in magnet housing cavity 408 through the magnet receiving opening 410 of the magnet holding bracket 104, the magnet may be securely retained therein and may not fall out inadvertently through the magnet receiving opening 410. It is noted that the shape of the magnet receiving opening 410 as described above is not limiting. That is, one of skill in the art can understand and appreciate that in other example embodiments, the magnet receiving opening 410 may have any other appropriate shape that aids in securely retaining a magnet in the magnet housing cavity 408 such that the magnet does not fall out of the magnet housing cavity 408 through the magnet receiving opening in the first surface of the magnet holding bracket. Further, in other example embodiments, the magnet housing cavity 408 may have any other appropriate shape without departing from a broader scope of the present disclosure.

In one example, the magnet that is to be housed in the magnet holding bracket 104 may be cylindrical in shape. The diameter of the cylindrical magnet may be slightly smaller than the diameter of the magnet receiving opening 410 on the first surface 404. Further, the thickness (or height) of the cylindrical magnet may be such that the magnet may fit within the magnet housing cavity 408 of the magnet holding bracket 104. In said example, to insert the cylindrical magnet within the magnet housing cavity 408, the cylindrical magnet may be rotated such that a plane that passes through the thickness of the cylindrical magnet and is parallel to the two circular end surfaces of the cylindrical magnet may be substantially perpendicular to the first surface 404 of the magnet holding bracket 104. Further, the cylindrical magnet may be pushed towards and partially inserted into the magnet housing cavity 408 through the substantially semicircular top opening portion 412 of the magnet receiving opening 410. Then, the cylindrical magnet may be further rotated to slide and fit into the magnet housing cavity 408 such that the two circular end surfaces of the cylindrical magnet may be substantially parallel to the first and second surfaces (404, 504) of the magnet holding bracket 104. Once the cylindrical magnet is disposed in the magnet housing cavity 408 of the magnet holding bracket 104, the restraining tabs 416 of the first surface 404 may securely retain the cylindrical magnet in the magnet housing cavity 408 such that it does not inadvertently fall out through the magnet receiving opening 410. A cylindrical magnet disposed in the magnet housing cavity 408 may be removed by following the above described steps for inserting the cylindrical magnet into the magnet housing cavity 408 in a reverse order. That is, the cylindrical magnet may be pulled up within the magnet housing cavity 408, rotated such that the plane through the thickness of the cylindrical magnet may be substantially perpendicular to the first surface 404 of the magnet holding bracket 104, and pulled out from the magnet housing cavity 408 through the substantially semicircular top opening portion 412 of the magnet receiving opening 410 on the first surface 404.

In addition to the alignment cavity 406, the magnet housing cavity 408, and the magnet receiving opening 410 in the first surface 404, the magnet holding bracket 104 may include injection molding openings 418 that are formed in the second surface 504. The injection molding openings 418 may lead into the magnet housing cavity 408. In particular, the injection molding openings 418 may be axially aligned and may mirror the restraining tabs 416 on the first surface 404 of the magnet holding bracket 104. In other example embodiments where the magnet holding bracket 104 is formed using other manufacturing methods, such as die casting, extrusion molding, etc., the resulting magnet holding bracket may not include injection molding openings 418.

Figure 6:
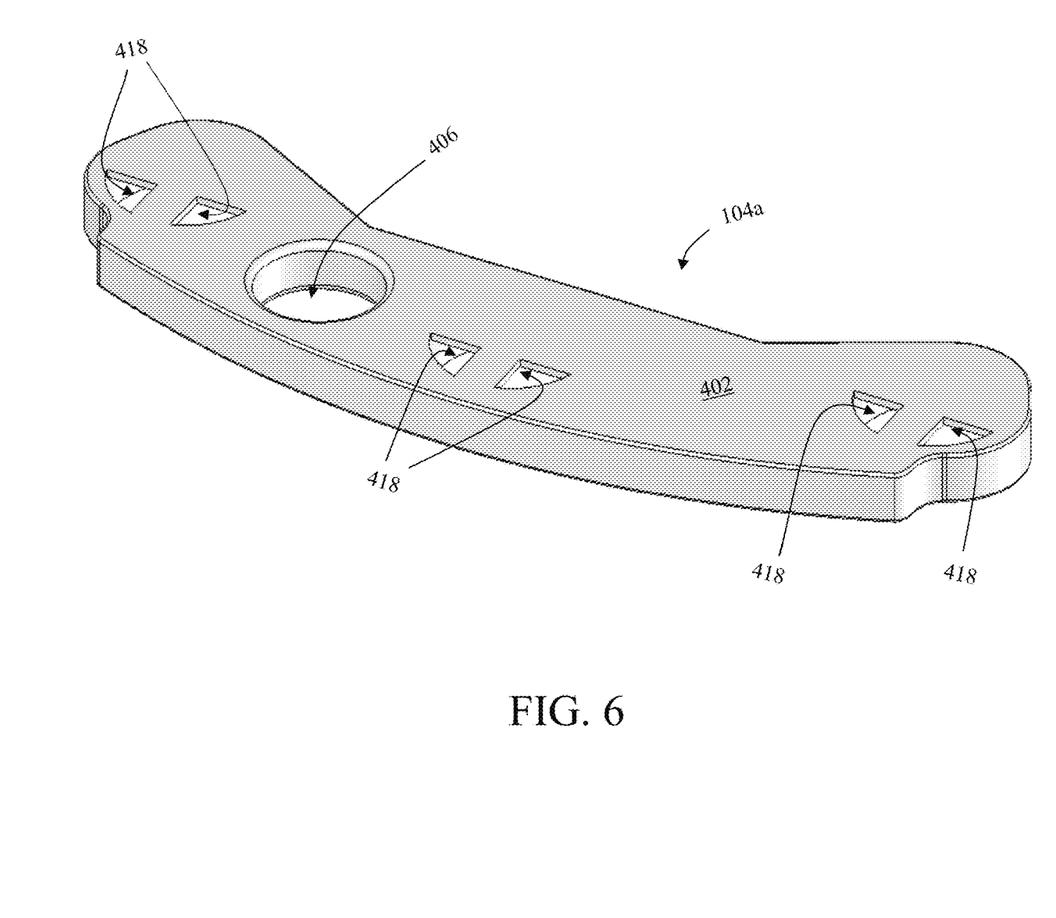
FIG. 6 illustrates a perspective view of a second example magnet holding bracket, in accordance with example embodiments of the present disclosure.

Further, the magnet holding bracket 104 may include a plurality of lightening through holes 420 that are formed in the body 402 of the magnet holding bracket 104 to make the magnet holding bracket 104 lighter in weight. In some example embodiments, as illustrated in FIGS. 6 and 7, the body 402 of the magnet holding bracket 104a may not include the lightening through holes 420.

Figure 8:
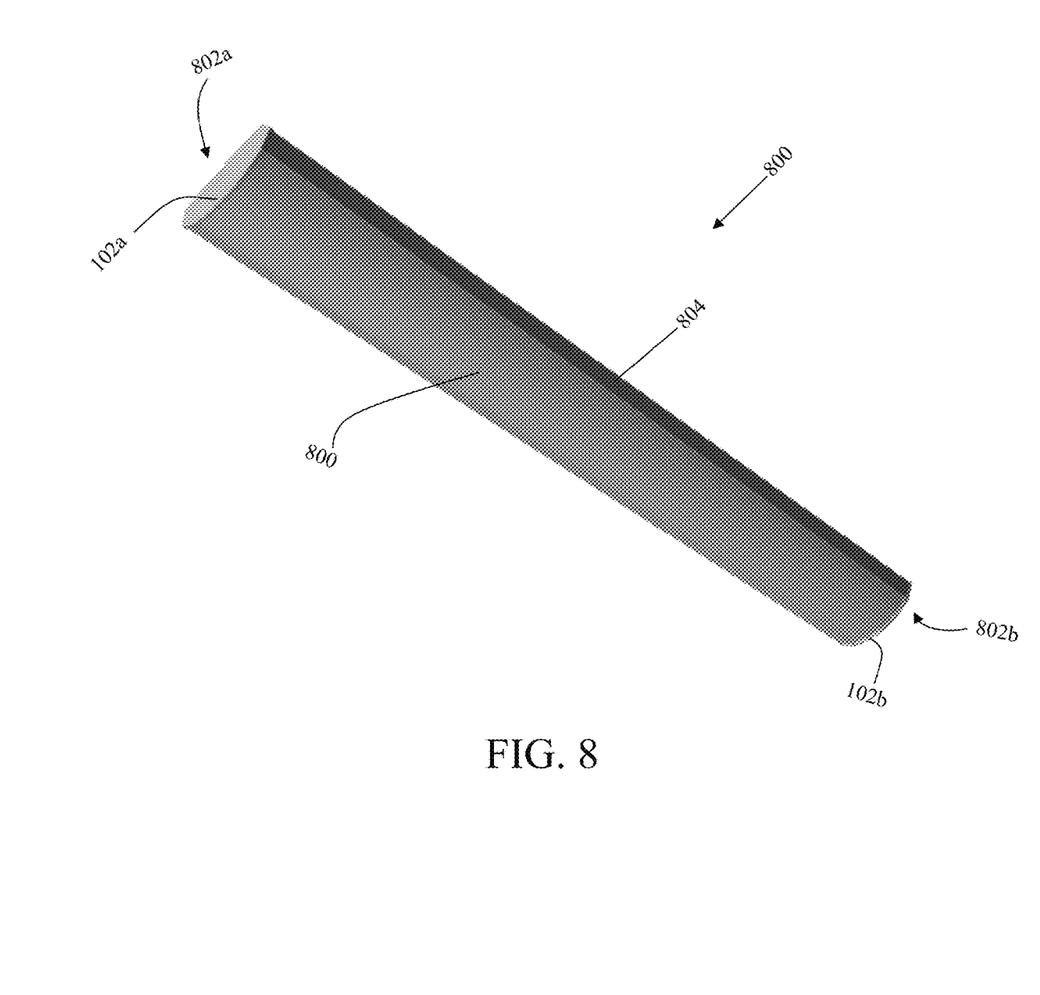
FIG. 8 illustrates a perspective view of a linear luminaire comprising the magnetic row mounting system of FIG. 1 disposed therein, in accordance with example embodiments of the present disclosure.
Figure 9:
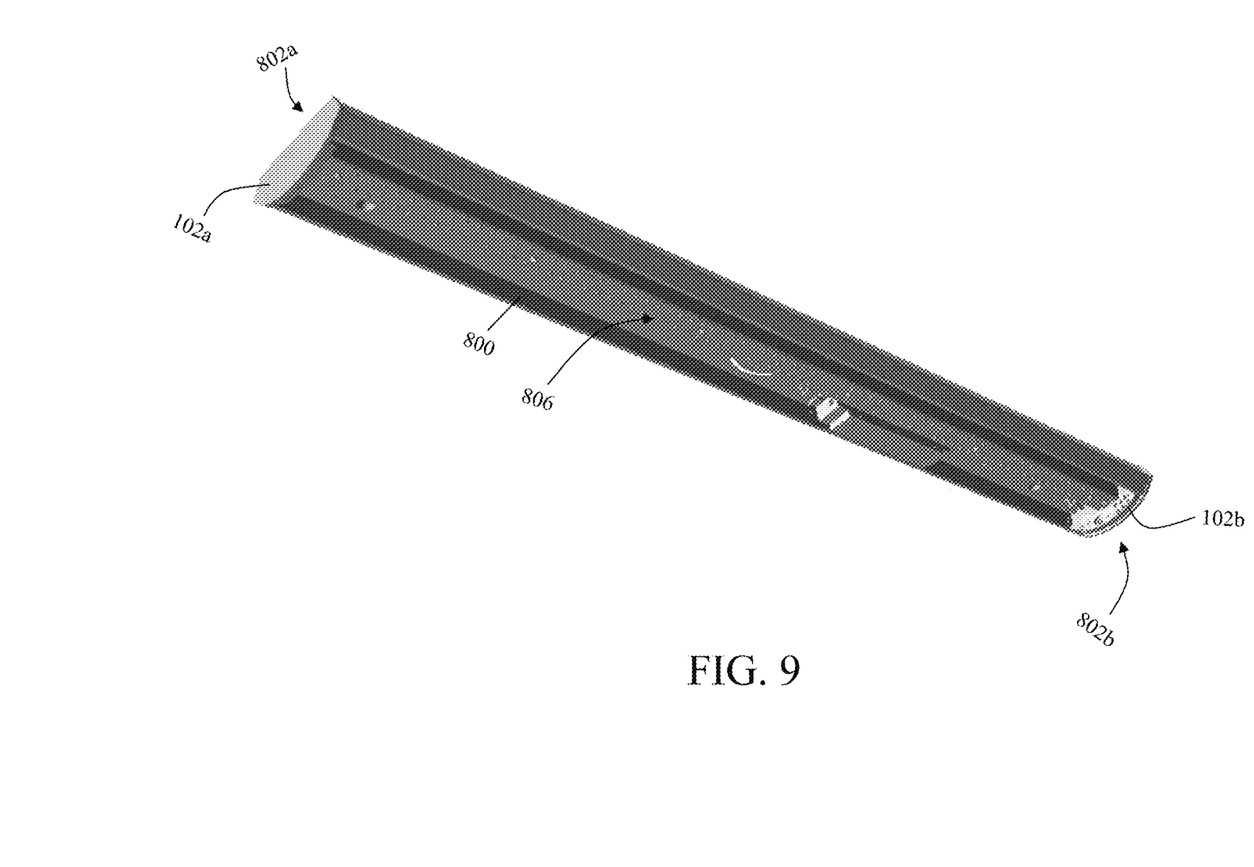
FIG. 9 illustrates a perspective view of the linear luminaire of FIG. 8 without the optical lens, in accordance with example embodiments of the present disclosure.
Figure 10:
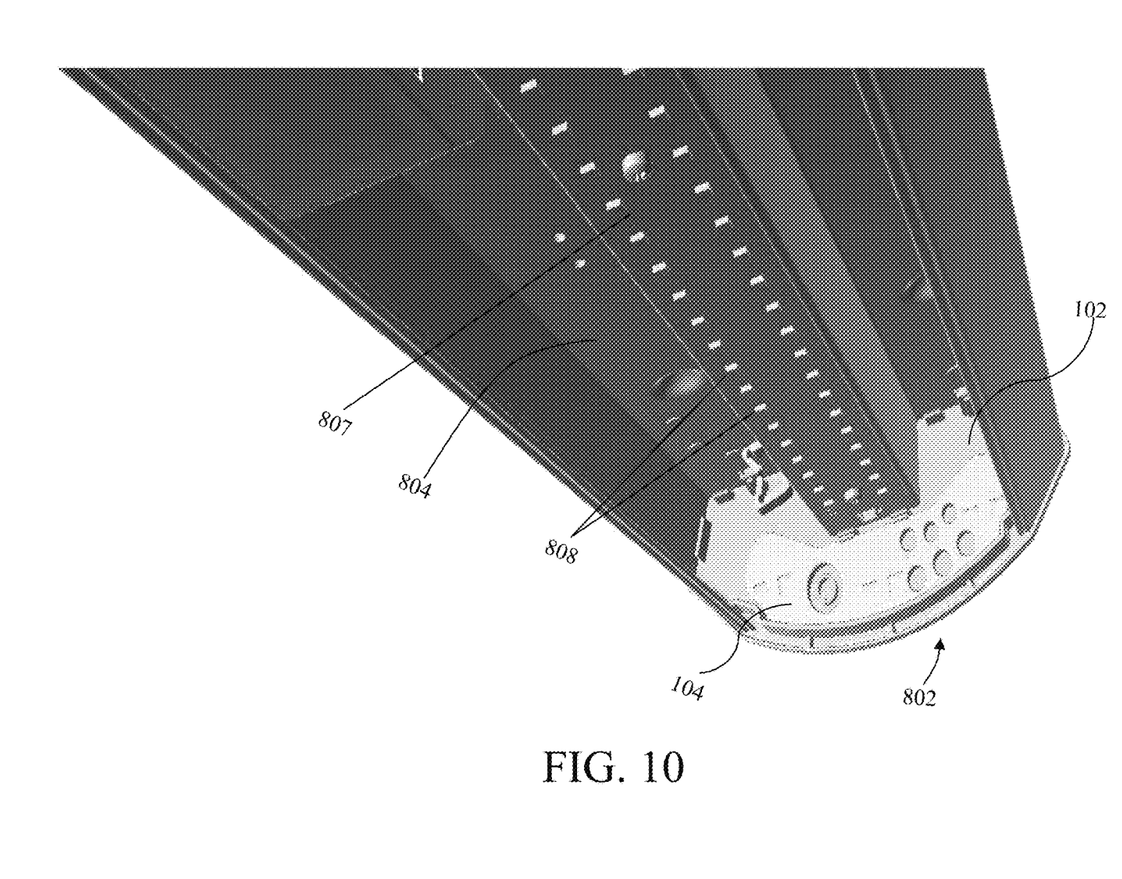
FIG. 10 illustrates an enlarged view of one end plate of the linear luminaire of FIG. 8 with the first example magnet holding bracket coupled thereto, in accordance with example embodiments of the present disclosure.

Referring to FIGS. 8-10, an example luminaire 800 may include a pair of end plates 102 that are coupled to a housing 804 of the luminaire 800 such that the end plates 102 cover the ends 802 of the luminaire 800. For example, a first end plate 102a may be disposed on one end 802a of the luminaire 800, while a second end plate 102b may be disposed on the opposite end 802b of the luminaire 800. The housing 804 may be configured to house a light assembly 806 therein. The light assembly 806 may include a circuit board 807 that is attached to the housing 804 and a plurality of light emitting diodes (LEDs) 808 that are disposed thereon. Further the luminaire 800 may include an optical lens 810 that is coupled to the housing 804 and disposed below the light assembly 806 such that a light emitted by the light assembly 806 exits the luminaire 800 through the optical lens 810 and the optical lens 810 conceals the light assembly 806 from the direct view of a user that looks up at the luminaire 800.

One or both the first and second end plates (102a, 102b) may include the magnet holding bracket 104 coupled thereto. In one example, the magnet holding bracket 104 of the first end plate 102a may house a first set of magnets such that a first pole of the first set of magnets faces the first end plate 102a while the second opposite pole of the first set of magnets faces the second end plate 102b disposed at the opposite end 802b. In said example, the magnet holding bracket 104 of the second end plate 102b may house a second set of magnets such that a first pole of the second set of magnets faces the first end plate 102a, while the second opposite pole of the second set of magnets faces the second end plate 102b.

In another example, the magnet holding bracket 104 of the first end plate 102a may house a first set of magnets such that a first pole of the first set of magnets faces the first end plate 102a while the second opposite pole of the first set of magnets faces the second end plate 102b disposed at the opposite lateral end 802b. In said other example, the magnet holding bracket 104 of the second end plate 102b may house a second set of magnets such that a first pole of the second set of magnets faces the second end plate 102b, while the second opposite pole of the second set of magnets faces the first end plate 102a. The first and second poles may be opposite poles, e.g., north pole and south pole.

Figure 12A:
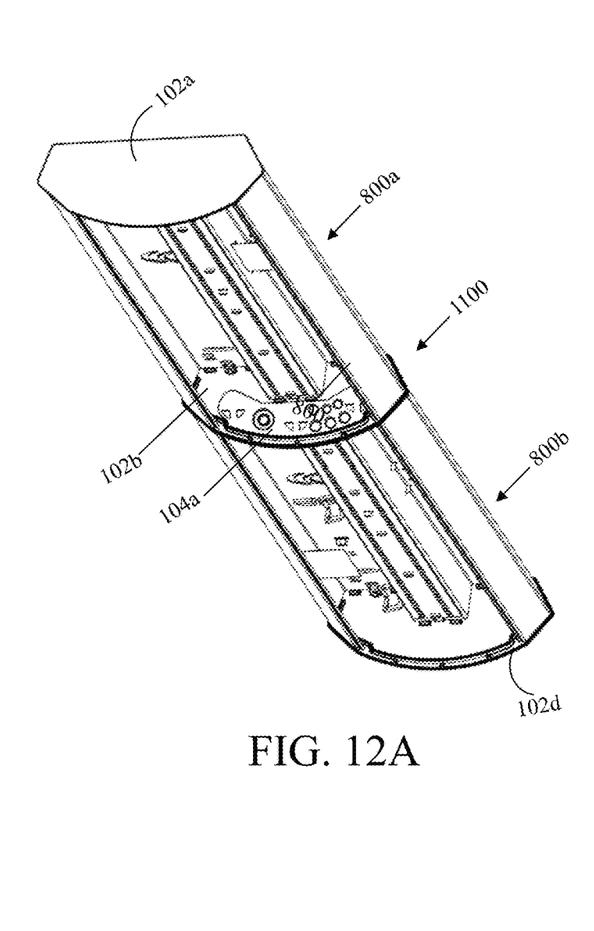
FIGS. 12A and 12B (collectively 'FIG. 12') illustrate different views of the example row mounted luminaire assembly of FIG. 11 with the optical lens being removed therefrom, in accordance with example embodiments of the present disclosure.
Figure 12B:
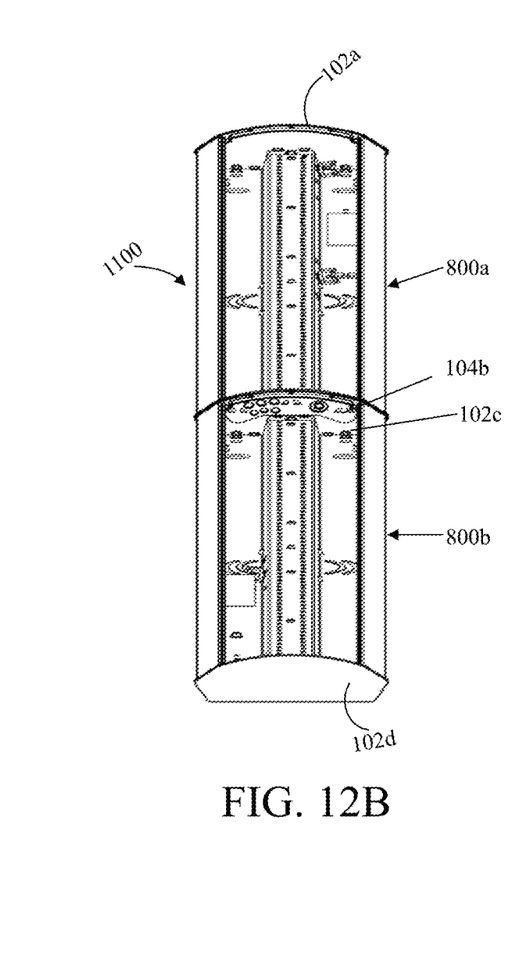

Further, in some example embodiments, only one of the end plates 102 may include the magnet holding bracket 104 and the magnets disposed therein. For example, the outer end plates of the luminaires that are disposed at the ends of a row mounted configuration may not include the magnet holding bracket 104. That is, as illustrated in FIGS. 11 and 12, in some example embodiments, the first outer end plate 102a of the first luminaire 800a and second outer end plate 102d of the second luminaire 800b may not include the magnet holding bracket 104, where the first and second luminaires 800a and 800b are row mounted. In the example embodiment illustrated in FIGS. 11 and 12, the first inner end plate 102b of the first luminaire 800a may include a first magnet holding bracket 104a and the second inner end plate 102c of the second luminaire 800b may include a second magnet holding bracket 104b. The magnets that are disposed in the inner end plates (102b, 102c) of the first and second luminaires (800a, 800b) may be oriented such that their polarities are opposite, thereby causing the luminaires (800a, 800b) to attract each other and create a seamless or continuous row of luminaires 1100.

Even though FIGS. 11 and 12 illustrate only two luminaires (800a, 800b) that are row mounted using the magnetic row mounting system 100, one of skill in the art can understand and appreciate that more than two luminaires can be row mounted using the magnetic row mounting system without departing from a broader scope of the present disclosure. Further, although a suspension mechanism is not shown in FIGS. 8-12, it should be understood that the luminaires 800a and 800b can be suspended from a ceiling or other surface and such suspension may permit the luminaires to swing from side to side. The first and second luminaires (800a, 800b) that are magnetically coupled to each other in the row mounted configuration may not be rigidly connected to each other, thereby allowing them to detach from each other without damaging the luminaires (800a, 800b) when sufficient force to overcome the magnetic force between the luminaires (800a, 800b) is applied to one or more of the luminaire (800a, 800b). Furthermore, the magnetic force may re-align the detached luminaires back into the row mounted configuration.

Even though the present disclosure describes the magnetic row mounting system being used to row mount luminaires that are suspension mounted, one of skill in the art can understand and appreciate that the magnetic row mounting system can be used with any appropriate luminaire without departing from a broader scope of the present disclosure. Further, even though the present disclosure describes the magnet holding brackets that house the magnets as being removably coupled to the end plates that are disposed at the ends of the luminaires, one of skill in the art can understand and appreciate that in other example embodiments, the magnet holding brackets and the magnets disposed therein may be coupled to any other portion of the luminaire without departing from a broader scope of the present disclosure. For example, the magnet holding brackets and the magnets disposed therein may be coupled to the side rails or long edges of the luminaire such that the luminaires can be coupled to each other or stacked along their long ends instead of being row mounted along their ends.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A magnetic row mounting system comprising:
a magnet holding bracket that is configured to be removably coupled to an end plate of a luminaire, the magnet holding bracket comprising:
a body that has a first surface and a second surface, the first surface being opposite to the second surface; and
a magnet housing cavity that is formed in the body and configured to house a magnet therein.

2. The magnetic row mounting system of claim 1, wherein each magnet housing cavity of the magnet holding bracket extends from a magnet receiving opening in the first surface to the second surface.

3. The magnetic row mounting system of claim 2, wherein the magnet receiving opening is defined by a pair of restraining tabs that are configured to securely retain the magnet that is disposed in the magnet housing cavity.

4. The magnetic row mounting system of claim 1 further comprising: an alignment cavity that is formed in the body and configured to receive an orientation tab of the end plate therein to removably couple the magnet holding bracket to the end plate in only one direction, wherein the one direction is such that the first surface of the magnet holding bracket that comprises a magnet receiving opening faces an inner surface of the end plate of the luminaire.

5. The magnetic row mounting system of claim 1, wherein the body of the magnet holding bracket further comprises a plurality of lightening holes that are configured to reduce a weight of the magnet holding bracket.

6. A magnetic row mounting system comprising:
an end plate of a luminaire that is configured to be coupled to and cover an end of a luminaire; and
a magnet holding bracket that is configured to be removably coupled to the end plate of the luminaire, the magnet holding bracket comprising:
a body that has a first surface and a second surface, the first surface being opposite to the second surface;
a magnet housing cavity that is formed in the body and configured to house a magnet therein.

7. The magnetic row mounting system of claim 6, wherein the end plate comprises:
a base;
a sidewall that is substantially perpendicular to the base and extends along a perimeter of the base; and
a plurality of coupling features that are disposed on the base, the plurality of coupling features being configured to removably couple the magnet holding bracket to the end plate.

8. The magnetic row mounting system of claim 7, wherein the plurality of coupling features comprise:
a set of snap fit tabs that are configured to engage the magnet holding bracket to removably couple the magnet holding bracket to the end plate; and
a retaining wall that is disposed below the set of snap fit tabs and is configured to support the magnet holding bracket thereon when the magnet holding bracket is removably coupled to the end plate.

9. The magnetic row mounting system of claim 6, wherein the magnet housing cavity of the magnet holding bracket extends from a magnet receiving opening in the first surface to the second surface, and wherein the magnet receiving opening is defined by a pair of restraining tabs that are configured to securely retain the magnet that is disposed in the magnet housing cavity.

10. The magnetic row mounting system of claim 6 further comprising: an alignment cavity that is formed in the body and configured to receive an orientation tab of the end plate therein to removably couple the magnet holding bracket to the end plate in only one direction, wherein the one direction is such that a first surface of the magnet holding bracket that comprises a magnet receiving opening faces an inner surface of the end plate of the luminaire.

11. The magnetic row mounting system of claim 6, wherein the luminaire is a suspension mounted luminaire.

12. The magnetic row mounting system of claim 6, wherein the body of the magnet holding bracket further comprises a plurality of lightening holes that are configured to reduce a weight of the magnet holding bracket.

13. The magnetic row mounting system of claim 6, wherein the end plate comprises a knockout tab that is configured to be detached from the end plate to define a wire routing channel, and wherein the wire routing channel is configured to route electrical wires from the luminaire to another luminaire that is row mounted with the luminaire.

14. A luminaire system comprising:
- a first luminaire comprising:
  - a first end;
  - a first end plate that is coupled to the first end to cover the first end of the first luminaire; and
  - a first magnet holding bracket that is removably coupled to the first end plate and housing a first set of magnets such that a first pole of the first set of magnets faces an inner surface of the first end plate; and
- a second luminaire comprising:
  - a second end;
  - a second end plate that is coupled to the second end to cover the second end of the second luminaire;
  - a second magnet holding bracket that is removably coupled to the second end plate and housing a second set of magnets such that a second pole of the second set of magnets faces an inner surface of the second end plate,
    - wherein the first pole of the first set of magnets is opposite to the second pole of the second set of magnets such that the first set of magnets housed in the first magnet holding bracket at the first end plate attract the second set of magnets housed in the second magnet holding bracket at the second end plate to magnetically couple the first luminaire and the second luminaire at the first end and the second end in a row mounted configuration.

15. The luminaire system of claim 14, wherein the first pole is a north pole and the second pole is the south pole, or vice-versa.

16. The luminaire system of claim 14, wherein each of the first magnet holding bracket and the second magnet holding bracket comprises:
- a body that has a first surface and a second surface, the first surface being opposite to the second surface;
- a plurality of magnet housing cavities that are formed in the body, each magnet housing cavity of the plurality of magnet housing cavities configured to house a magnet therein; and
- an alignment cavity that is formed in the body.

17. The luminaire system of claim 16, wherein each magnet housing cavity extends from a magnet receiving opening in the first surface to the second surface, and wherein the magnet receiving opening is defined by a pair of restraining tabs that are configured to securely retain the magnet that is disposed in the magnet housing cavity.

18. The luminaire system of claim 16, wherein the body of each of the first magnet holding bracket and the second magnet holding bracket further comprises a plurality of lightening holes that are configured to reduce a weight of each of the first magnet holding bracket and the second magnet holding bracket.

19. The luminaire system of claim 14, wherein each of the first end plate and the second end plate comprises a knockout tab that is configured to be detached from the first end plate and the second end plate, respectively, to define a wire routing channel to route electrical wires from the first luminaire to the second luminaire.

20. The luminaire system of claim 14, wherein each of the first end plate and the second end plate comprises an orientation tab.

* * * * *